(12) United States Patent
Garvey et al.

(10) Patent No.: US 10,789,065 B2
(45) Date of Patent: Sep. 29, 2020

(54) METHOD FOR AUTOMATICALLY SELECTING CONFIGURATION CLUSTERING PARAMETERS

(71) Applicant: Oracle International Corporation, Redwood Shores, CA (US)

(72) Inventors: Dustin Garvey, Exeter, NH (US); Amit Ganesh, San Jose, CA (US); Timothy Mark Frazier, Livermore, CA (US); Shriram Krishnan, Sr., Oakland, CA (US); Uri Shaft, Fremont, CA (US); Prasad Ravuri, San Jose, CA (US); Sampanna Shahaji Salunke, Dublin, CA (US); Sumathi Gopalakrishnan, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 73 days.

(21) Appl. No.: 15/972,650

(22) Filed: May 7, 2018

(65) Prior Publication Data

US 2019/0339965 A1  Nov. 7, 2019

(51) Int. Cl.
*G06F 8/71* (2018.01)
*G06F 16/901* (2019.01)
(Continued)

(52) U.S. Cl.
CPC .................. *G06F 8/71* (2013.01); *G06F 8/60* (2013.01); *G06F 16/24578* (2019.01); *G06F 16/285* (2019.01); *G06F 16/9024* (2019.01)

(58) Field of Classification Search
CPC .... G06F 8/71; G06F 16/285; G06F 16/24578; G06F 16/9024; G06F 8/60
See application file for complete search history.

(56) References Cited

U.S. PATENT DOCUMENTS 6,801,937 B1  10/2004 Novaes et al.
7,020,695 B1   3/2006 Kundu et al.
(Continued)

FOREIGN PATENT DOCUMENTS

WO  2011/102891 A1  8/2011
WO  2011/151500 A1  12/2011
WO  2017/123683 A1  7/2017

OTHER PUBLICATIONS

Maarek Y. S., "On the Use of Cluster Analysis for Assisting Maintenance of Large Software Systems", Computer Systems and Software Engineering, 1988 Proceedings, the Third Israel Conference on Computer Systems and Software Engineering 1988, pp. 178-186.

(Continued)

*Primary Examiner* — Wei Y Zhen
*Assistant Examiner* — Amir Soltanzadeh
(74) *Attorney, Agent, or Firm* — Invoke

(57) ABSTRACT

Techniques for analyzing, understanding, and remediating differences in configurations among many software resources are described herein. Machine learning processes are applied to determine a small feature set of parameters from among the complete set of parameters configured for each software resource. The feature set of parameters is selected to optimally cluster configuration instances for each of the software resources. Once clustered based on the values of the feature set of parameters, a graph is generated for each cluster of configuration instances that depicts the differences among the configuration instances within the cluster. An interactive visualization tool renders the graph in a user interface, and a management tool allows changes to the graph and changes to the configuration of one or more software resources.

33 Claims, 12 Drawing Sheets

(51) Int. Cl.
*G06F 8/60* (2018.01)
*G06F 16/2457* (2019.01)
*G06F 16/28* (2019.01)

(56) References Cited

U.S. PATENT DOCUMENTS

| | | | |
|---|---|---|---|
| 8,261,295 | B1 | 9/2012 | Risbood et al. |
| 9,147,167 | B2 | 9/2015 | Urmanov et al. |
| 9,265,859 | B2 | 2/2016 | Gibson et al. |
| 9,420,513 | B1 | 8/2016 | Yalagandula et al. |
| 9,514,213 | B2 | 12/2016 | Wood et al. |
| 2004/0122797 | A1* | 6/2004 | Mishra .................. G06K 9/6218 |
| 2005/0278445 | A1 | 12/2005 | Quang et al. |
| 2005/0289538 | A1 | 12/2005 | Black-Ziegelbein et al. |
| 2007/0050497 | A1 | 3/2007 | Haley et al. |
| 2009/0282133 | A1* | 11/2009 | Walker .................... H04L 67/34 709/221 |
| 2009/0316699 | A1 | 12/2009 | Mark et al. |
| 2011/0231508 | A1 | 9/2011 | Torii |
| 2012/0254183 | A1 | 10/2012 | Ailon et al. |
| 2014/0280886 | A1* | 9/2014 | Burns .................... H04L 43/04 709/224 |
| 2016/0105544 | A1* | 4/2016 | Liu .................... H04M 3/2227 379/32.01 |
| 2016/0314184 | A1* | 10/2016 | Bendersky .............. G06F 16/35 |

OTHER PUBLICATIONS

Ham et al., "Interactive Visualization of Small World Graphs", INFOVIS '04 Proceedings of the IEEE Symposium on Information Visualization, 2004, pp. 199-206.

Witten, Daniela M. & Robert Tibshirani (2010), "A framework for feature selection in clustering", Journal of the American Statistical Association, vol. 105, No. 490, pp. 713-726: 2010.

Tibshirani, Robert, Guenther Walther, & Trevor Hastie (2001), "Estimating the number of clusters in a data set via the gap statistic", Journal of the Royal Statistical Society B, vol. 63, Part 2, pp. 411-423: 2001.

Huang, Z. (1997), "A fast clustering algorithm to cluster very large categorical data sets in data mining", Proceedings of the SIGMOD Workshop on Research Issues on Data Mining and Knowledge Discovery, Dept. of Computer Science, the University of British Columbia, Canada, pp. 1-8.

* cited by examiner

| Parameter | Type | Cardinality | Selected? |
|---|---|---|---|
| result_cache_max_size | numeric | 21 | X |
| log_buffer | numeric | 19 | X |
| transactions | numeric | 18 | X |
| sga_max_size | numeric | 18 | X |
| sessions | numeric | 17 | X |
| sga_target | numeric | 17 | X |
| pga_aggregate_target | numeric | 17 | X |
| shared_pool_size | numeric | 16 | X |
| _highthreshold_undoretention | numeric | 11 | X |
| processes | numeric | 10 | X |
| cpu_count | numeric | 9 | X |
| job_queue_processes | numeric | 9 | X |
| parallel_max_servers | numeric | 9 | X |
| undo_retention | numeric | 7 | X |
| db_writer_processes | numeric | 6 | X |
| db_files | numeric | 6 | X |
| dml_locks | numeric | 6 | X |
| parallel_servers_target | numeric | 6 | X |
| _fix_control | categorical | 6 | X |
| log_archive_max_processes | numeric | 5 | X |
| open_cursors | numeric | 5 | X |
| resource_manager_cpu_allocation | numeric | 5 | X |
| session_max_open_files | numeric | 4 | |
| _b_tree_bitmap_plans | categorical | 4 | |
| shared_servers | numeric | 4 | |
| session_cached_cursors | numeric | 4 | |
| ... | ... | ... | ... |

FIG. 4

| Parameter | Weight | High? | Selected? |
|---|---|---|---|
| db_files | 0.39 | X | X |
| sessions | 0.35 | X | X |
| transactions | 0.34 | X | X |
| processes | 0.33 | X | X |
| log_archive_max_processes | 0.25 | X | X |
| db_writer_processes | 0.23 | X | |
| resource_manager_cpu_allocation | 0.23 | X | |
| shared_pool_size | 0.18 | | |
| job_queue_processes | 0.17 | | |
| _fix_control | 0.17 | | |
| cpu_count | 0.15 | | |
| result_cache_max_size | 0.14 | | |
| sga_target | 0.12 | | |
| sga_max_size | 0.12 | | |
| log_buffer | 0.12 | | |
| parallel_servers_target | 0.10 | | |
| parallel_max_servers | 0.08 | | |
| pga_aggregate_target | 0.08 | | |
| undo_retention | 0.06 | | |
| _highthreshold_undoretention | 0.06 | | |
| open_cursors | 0.05 | | |
| dml_locks | 0.03 | | |

FIG. 7

| Cluster | Count | Center |
|---|---|---|
| 2<br><br>standard | 2466 | db_files: {200 (80%), 1024 (18%), ...}<br>log_archive_max_processes: {8 (99%), ...}<br>processes: {5000 (88%), 6000 (6%), ...}<br>sessions: {7680 (87%), 9056 (6%), ...}<br>transactions: {8448 (87%), 9960 (6%), ...} |
| 3<br><br>+compute | 993 | db_files: {200 (98%), ...}<br>log_archive_max_processes: {8 (99%), ...}<br>processes: {10000 (100%)}<br>sessions: {15360 (100%)}<br>transactions: {16896 (100%)} |
| 1<br><br>+compute<br>+ability to sprawl | 96 | db_files: {1024 (98%), ...}<br>log_archive_max_processes: {8 (100%)}<br>processes: {10000 (100%)}<br>sessions: {15360 (100%)}<br>transactions: {16896 (100%)} |
| 0<br><br>sprawl | 29 | db_files: {7000 (100%)}<br>log_archive_max_processes: {16 (96%), ...}<br>processes: {9000 (58%), 8000 (37%), ...}<br>sessions: {13568 (41%), 12048 (34%), 13552 (10%), ...}<br>transactions: {14924 (41%), 13252 (34%), 14906 (10%), ...} |

FIG. 8

METHOD FOR AUTOMATICALLY SELECTING CONFIGURATION CLUSTERING PARAMETERS

RELATED APPLICATIONS

This application is related to U.S. Provisional Application 62/566,235, entitled ARTIFICIAL INTELLIGENCE DRIVEN CONFIGURATION MANAGEMENT, filed on Sep. 29, 2017, which is incorporated by reference herein.

TECHNICAL FIELD

The present disclosure relates to managing configuration of deployed software resources. Specifically, the disclosure is directed to selecting a feature set of configuration parameters used to cluster software resources.

BACKGROUND

Software configuration management involves tracking and controlling changes to software resources. Software configuration management is often complicated by the combinatorial nature in the software domain. The number of possible configurations settings and other attributes of a software resource may extremely large. Along with changes provided through default configuration options, users may apply patches and other custom code. As a result, the number of distinct configurations of a software resource may be significant in datacenters, cloud platforms, and other large-scaler system environments.

One approach for tracking and controlling changes to software resources includes the manual creation of a gold image. According to this approach, a system administrator or resource provider selects base configurations settings for a group of software deployments and creates a software image (may be referred to herein as the "gold" image) that includes these configuration settings. Software deployments are then compared to the gold image to identify configuration differences.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 is a screenshot providing an example of selecting a subset of parameters based on having moderate cardinality, in accordance with one or more embodiments;

FIG. 7 is a screenshot providing an example of selecting a feature set of parameters based on assigned weights, in accordance with one or more embodiments;

FIG. 8 is a screenshot providing an example of summarizing a set of clusters, in accordance with one or more embodiments;

DETAILED DESCRIPTION

Figure 1:
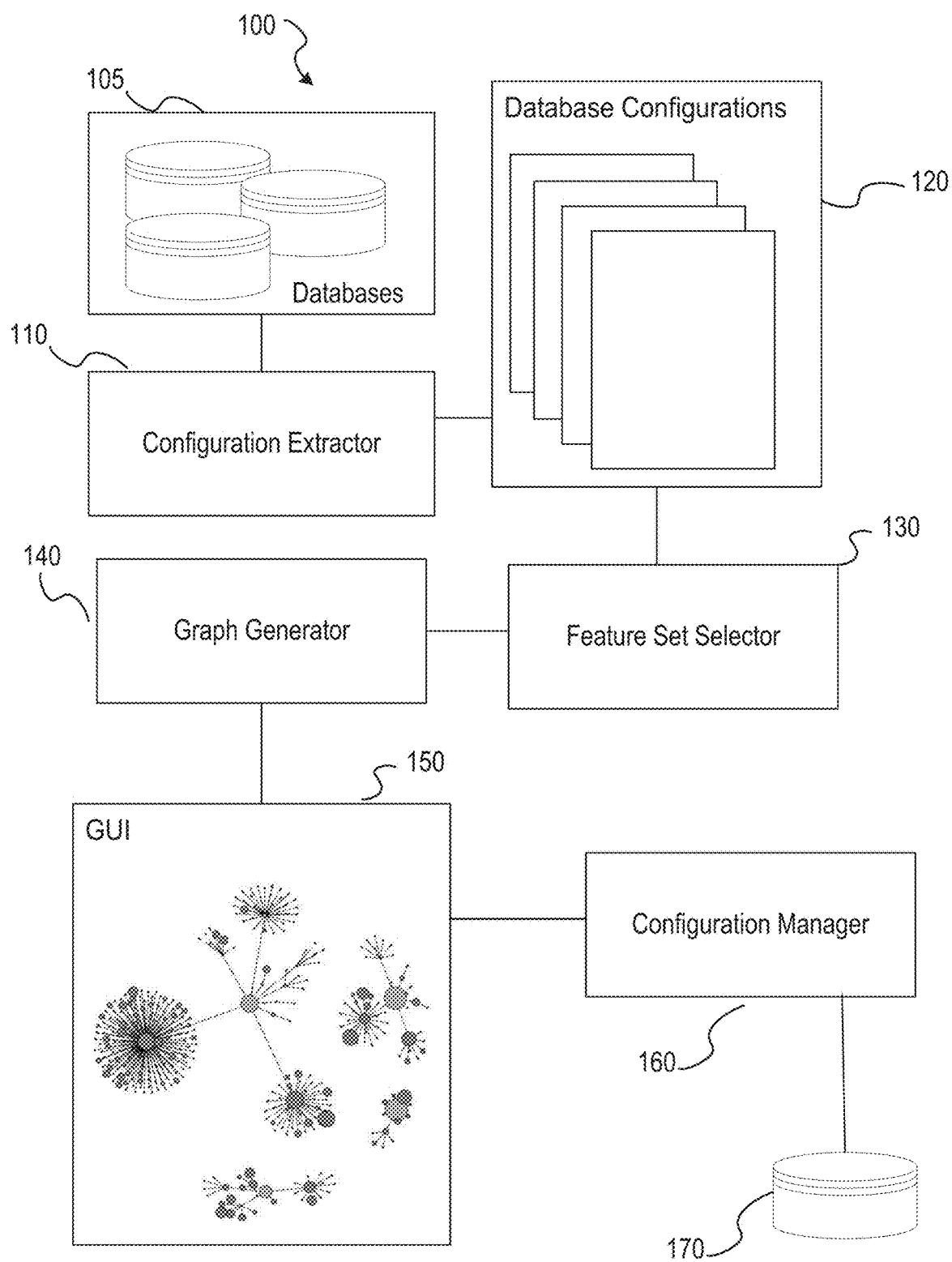
FIG. 1 is a block diagram that illustrates components of the system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. General Overview

One or more embodiments include selecting a subset of configuration parameters on which to cluster configuration instances of software resources. Software resources may have hundreds of configurable parameters. Comparing values for all parameters may be too complex and not helpful for identifying issues related to configuration drift. The parameter values most meaningful to compare are those whose values expected to be the same or similar across software deployments but for which multiple distinct values are possible.

Techniques are presented herein for selecting an optimal feature set of configuration parameters. The selected feature set may be a small subset of the parameters that are configured for a software deployment. After clustering software resources based on their values for the feature set of parameters, a visualization tool of the clusters enables comparing configurations among software resources.

One or more embodiments described in this Specification and/or recited in the claims may not be included in this General Overview section.

2. Terminology

A software resource is an executable entity whose execution depends on a set of configuration parameters (also referred to as "attributes"). For example, a software resource may correspond to a database management system or some other component that supports a cloud service. In other embodiments, a software resource may be a standalone application or other software component. For example, the software resource may be a standalone desktop application. Thus, the techniques described herein may be applied across a wide range of software resource types. For purposes of explanation, the examples herein refer to database configurations. However, the disclosed techniques are not limited to analyzing database configurations. A software resource deployment is an instance of a software resource. Each software resource deployment may have a distinct configuration.

A configuration as used herein is a set of values assigned to each of the configuration parameters. A configuration can be represented in a variety of ways. For example, a vector of values may be used with an ordered list of parameters, with the position of a value within the vector indicating which parameter the value is assigned. Configurations may also be represented by a set of <parameter, value>pairs, for example.

A configuration instance as used herein is a configuration corresponding to a particular software resource deployment. Although the goal is to gain a better understanding of the software resource deployments, the goal is achieved by analyzing the associated configuration instances.

A feature set refers to a set of parameters which drive the process of clustering software resources. The feature set may include any combination of parameters collected from the software resources. In some cases, a feature set may include all the collected deployment parameters in addition to calculated features, if any. In an embodiment, the feature set is a small subset of all the configuration parameters.

A feature vector is a vector comprising values of a set of parameters (not always the feature set of parameters). In the example where the feature set is {CPU count, memory allocated, memory throughput, count_default_values_changed, count_undocumented_settings}, an example feature vector for the feature set of a configuration instance may be {320, 8 GB, 97%, 30, 25}. However, the values may vary between different deployments and feature vectors.

3. Configuration Clustering Architecture

FIG. 1 is a block diagram that illustrates components of the configuration clustering system, in accordance with one or more embodiments. System 100 includes components for selecting a set of parameters to use for clustering software resources and providing an interactive visual tool for illustrating differences in configuration. In one or more embodiments, system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component.

Databases 105 includes a set of databases whose configurations are to be analyzed. The databases in the set of databases 105 have a common set of parameters whose values are configured for the database. The databases being analyzed are expected to have the same or similar values for some of the parameters. A system administrator is likely to be interested when these values, expected to be similar, are configured to be (or drift over time to become) very different.

The Configuration Extractor 110 corresponds to software or hardware for extracting configurations from databases 105. The set of configuration parameters that are defined in the configuration and the corresponding value assigned to each configuration parameter are stored in a configuration instance corresponding to the database from which the configuration was extracted.

Database Configurations 120 includes a configuration instance for each of the databases 105. These configuration instances represent the database from which the configuration instances were extracted. The configuration instances may be stored in a data repository. In one embodiment, the data repository (not illustrated) is any type of storage unit and/or device (e.g., a file system, database, collection of tables, or any other storage mechanism) for storing data. Further, a data repository may include multiple different storage units and/or devices. The multiple different storage units and/or devices may or may not be of the same type or located at the same physical site.

Feature Set Selector 130 analyzes the configuration instances in database configurations 120 to determine an optimal feature set of parameters for the purposes of clustering configuration instances for analysis. Feature set selector 130 filters the multitude of configuration parameters through a variety of filters. Feature set selector 130 evaluates each parameter regarding: a) whether the parameter's value is expected to be similar/same across software resources and b) the number of distinct values assigned to the parameter across software resources. Feature set selector 130 selects parameters based on their ability to optimally cluster configuration instances.

Graph Generator 140 uses the feature set provided by feature set selector 130 to construct a graph of the configuration instances. Graph generator 140 clusters the configuration instances based on the values each assigns to the feature set parameters. For each cluster of configuration instances, graph generator 140 constructs a graph. For configuration instances within the same cluster, configuration instances having identical feature vectors are grouped together. The graph includes a node representing each distinct feature vector. Each node represents the set of configuration instances having the feature vector that the node represents. An edge between nodes represents a difference between the configurations represented by two connected nodes.

GUI 150 renders the hierarchical graph of the clusters constructed by graph generator 140 and provides one or more interactive interfaces that are based on the hierarchical graph. The interactive interfaces may allow a user to visualize, navigate, and otherwise access summary information about a cluster. Additionally or alternatively, the interactive interface may provide a user with options for performing one or more management operations based on the cluster results/summary.

Configuration Manager 160 may receive instructions from GUI 150 to perform an operation such as configuring a new database with parameter values in a configuration instance represented by a node in the graph. Configuration Manager 160 may (re)configure a database 170 according to a configuration instance selected in the user interface.

4. Operational Flow

Figure 2:
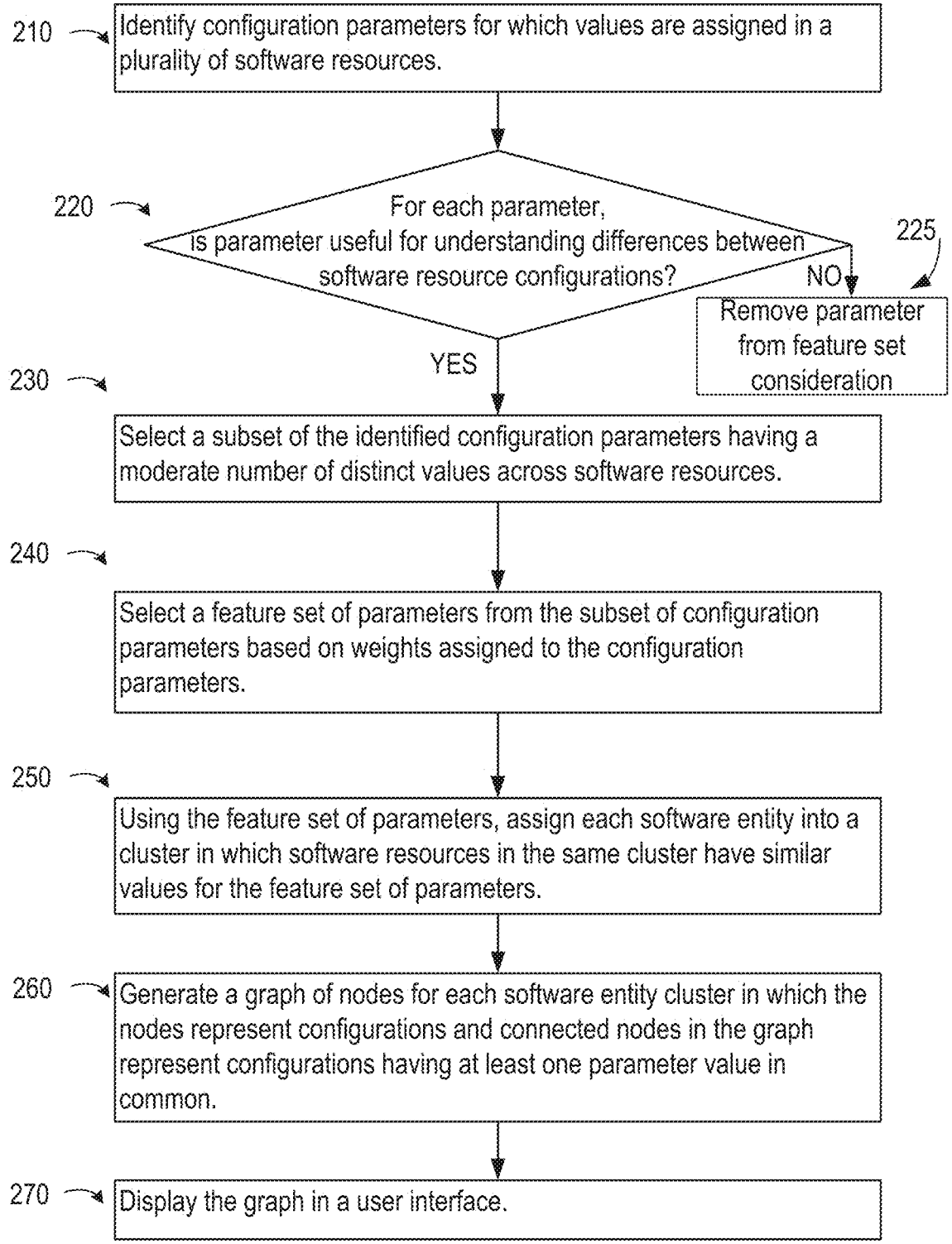
FIG. 2 is a flow diagram that illustrates at a high level process of filtering and selecting a feature set of parameters and using the feature set to create a visualization of configuration differences among a set of software resources, in accordance with one or more embodiments.

FIG. 2 is a flow diagram that illustrates the overall process of filtering and selecting a feature set of parameters and using the feature set to create a visualization of differences among configurations of a set of software resources. The feature set selector 130 analyzes the database configurations 120 and creates a list of all distinct parameters (Operation 210). This list of all distinct parameters across all database configurations under consideration is referred to herein as the entire parameter set.

Configuration Extractor 110 collects parameters from the software resources. Collecting parameters may include a discovery process using configuration files and/or initialization scripts. The parameters can be any attribute of the software resource having a quantifiable or discrete value.

The parameters used in the examples are configuration parameters. These parameters identify characteristics of a software resource that do not change dynamically during runtime, but which can affect the execution of a software deployment. For example, a static attribute may encode information about initial values, including an amount of resources such as number of CPUs, amount of memory, amount of storage, and network bandwidth.

Another kind of static configuration information may be more descriptive in nature. That is, the values do not necessarily change the way a software deployment executes, but rather describes the environment in which the software deployment executes. For example, parameters may identify the structure and relationships of components used to run a software resource. For example, a parameter may identify information about the target host (or hosts) on which the software resource is run, such as the geographic location, hostname, IP address, etc. In another example, a static attribute may capture topology/architecture information such as dependencies between different targets supporting a deployment of the software resource. In yet another example, a parameter may identify a list of available services that are supported by the deployment of the software resource.

However, configuration parameters are not the only kind of attributes that may be used. For example, parameters may be runtime attributes that identify characteristics of a software deployment that are captured during runtime. For example, the parameters may capture runtime performance attributes such as average/min/max CPU utilization, memory bandwidth, active sessions, I/O throughput, etc. The parameters may further capture bug reports, security vulnerabilities, log writing throughput, and other information captured during application runtime.

Parameters may also include attributes whose values are calculated (herein referred to as a "calculated parameter") from values of other parameters. For example, a calculated parameter may be a count of the number of configuration settings changed from default value or a count of the number of undocumented configuration settings utilized.

A configuration instance may include hundreds of parameters, of which only a number less than 10 may be selected for the feature set. Clustering configurations of deployments of software resources using the values of all the parameters may not be useful or practical. Thus, a small number (e.g., 5-7) of parameters for use in clustering may be selected. The selection process is directed to selecting the most useful parameters for clustering purposes.

One way to facilitate selecting the feature set from among a very large number of parameters is to remove from consideration those parameters that are unlikely to be useful for analysis. The selector 130 decides for each parameter whether the parameter values are likely to be useful for understanding differences between software resource configurations (Operation 220). A parameter that is not likely to be useful is removed from consideration (Operation 225). For example, clustering based on a version number may not convey useful information if all the deployments are running on the same version of a software resource or the administrator is not interested in using the version number as a distinguishing feature. For example, parameters may be removed that are common across most or all instances (very low cardinality) or have a high cardinality, such as a unique identifier such as database name. In general, a parameter having more than 100 or some other high number of distinct values will not provide much insight, and thus, may be removed. Such filtering may be done by the feature set selector 130. Additionally or alternatively, other filtering criteria may be used to identify parameters to be removed from the feature set. An administrator may remove parameters known to be uninteresting for purposes of clustering. The list of parameters remaining after removing uninteresting parameters is referred to herein as the filtered parameter list.

Feature set selector 130 further reduces the number of parameters from which to select a feature set by selecting only those parameters in the filtered parameter list having a moderate number of distinct values across the configuration instances (Operation 230). More detail regarding how selection is performed is described with response to FIG. 3. The parameters selected in Operation 230 are referred to herein as the parameters with moderate cardinality. The number of remaining parameters in the moderate cardinality list is roughly less than half of the entire parameter set.

Next, feature set selector 130 selects a feature set from among the parameters with moderate cardinality (Operation 240). The selector 130 uses an iterative process of assigning weights to the parameters, clustering configuration instances using the weighted parameters, and based on the clustering analysis, assigning a new set of weights. Once assignment of weights to the parameters is finalized, feature set selector 130 selects the feature set based on the final assigned weights. More detail regarding how weights for the parameters in the moderate cardinality list is performed may be found in the description of FIG. 5.

Graph generator 140 clusters the configuration instances using the selected feature set parameters (Operation 250). Graph generator 140 assigns to a common cluster those configuration instances having similar values for the feature set parameters. Any method of clustering software resources based on a feature set of parameters may be used. Examples of known methods include k-means, k-mode, and sparse hierarchical clustering. However, an example of how clustering may be performed may be found in the section titled "GENERATING CONFIGURATION INSTANCE CLUSTERS."

For each of the clusters of configuration instances created using the feature set of parameters, graph generator 140 creates a graph of nodes (Operation 260). Each node in the graph represents a unique combination of parameter values for all of the filtered set of parameters, and accordingly, all configuration instances assigned the same node have the same combination of parameter values. That is, the configuration instances assigned to the same node are identical with respect to the filtered parameter values. Graph generator 140 may connect two nodes in the graph when the set of parameter values is very similar (that is, having minimal differences). This is explained in more detail in the section "CREATING THE GRAPH."

GUI 150 renders the graph of nodes for the set of configuration instance clusters in a visual user interface. The visual user interface allows a user to interact with the graph to better understand the similarities and differences of parameter values across software resources (Operation 270). GUI 150 also interacts with the configuration manager 160 to perform management operations specified through the GUI. More detail on Operating 270 is explained in the section "INTERACTIVE INTERFACES FOR CONFIGURATION MANAGEMENT and MANAGEMENT OPERATIONS."

5. Selecting Parameters having Moderate Cardinality

Figure 3:
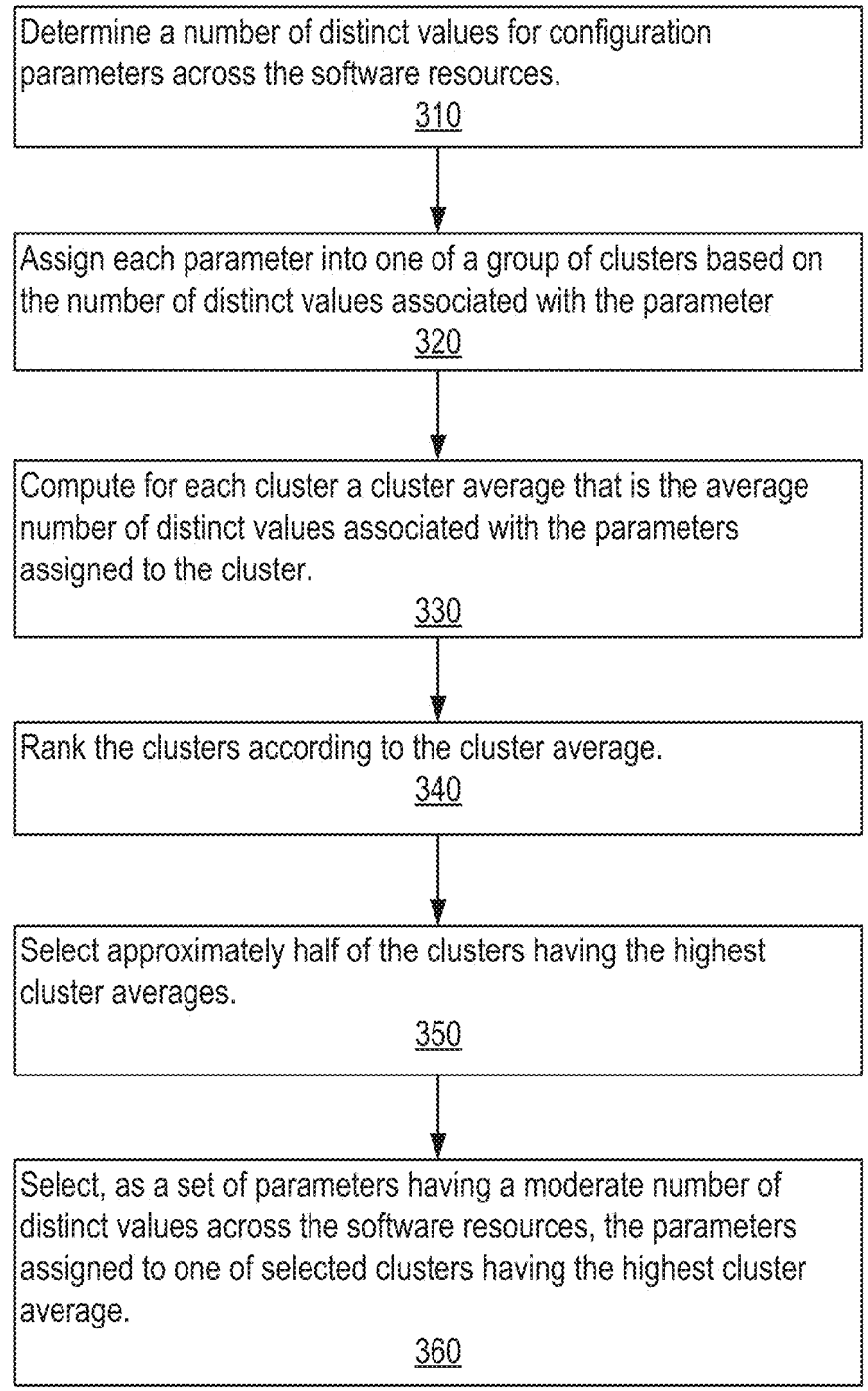
FIG. 3 is a flow diagram that illustrates selecting a subset of parameters based on having moderate cardinality, in accordance with one or more embodiments.

FIG. 3 is a flow diagram that illustrates selecting a subset of parameters based on having moderate cardinality, and describes Operation 220 in more detail, in accordance with one or more embodiments, and FIG. 4 is a screenshot providing an example of selecting a subset of parameters based on having moderate cardinality, in accordance with one or more embodiments. Feature set selector 130 analyzes the configuration instances to determine for each of the parameters in the filtered list of parameters, how many distinct values each parameter has (Operation 310). An example output of Operation 310 is shown in FIG. 4 which shows a table of parameters sorted in descending order of their corresponding cardinality values. For example, the parameter result_cache_max_size is the parameter having 21 distinct values, more than any other parameter. The parameter, session_cached_cursors only has 4 different values.

Feature set selector 130 clusters the filtered set of parameters based on their cardinalities (Operation 320). Tripoint clustering (TPC) may be used (see Urmanov, Aleksey & Anton Bougaev (2015), "Similarity analysis with tri-point data arbitration", U.S. Pat. No. 9,147,167, Filed November 2012, Issued September 2015 and Wood, Alan, Aleksey Urmanov, & Anton Bougaev (2016), "Per-attribute data clustering using tri-point data arbitration", U.S. Pat. No. 9,514,213, Filed March 2013, Issued December 2016).

From the values seen in FIG. 4, the parameters may be clustered as follows. There may be one cluster of parameters having cardinality of approximately 17 including the parameters between {result_cache-Max_size (21) and processes (10)}, one cluster of parameters having cardinality of approximately 6 including parameters having a cardinality of 5-9, and a cluster of parameters with cardinality around 4 including parameters with cardinality 4 or less.

Feature set selector 130 determines a center value for each cluster of parameters. For example, an average cardinality may be determined for the configuration instances within a cluster (Operation 330). Referring to the example, cluster 1 may have an average cardinality of 16.4, cluster 2 have an average cardinality of 6.6, and cluster 3 may have an average cardinality of almost 4.

Next, feature set selector 130 ranks the clusters in order of their center values (Operation 340). In our example, the ranking of clusters would be {cluster 1: 16.4, cluster 2: 6.6, cluster 3: <4).

Feature set selector 130 then splits the ranked list of clusters approximately in half (Operation 350). Each cluster is assigned to the upper half or the lower half. When there is an odd number of clusters, the upper or the lower half will have one more cluster than the other. For example, the upper half of the ranked listing of clusters may include clusters 1 and 2, and the lower half may include cluster 3.

Feature set selector 130 selects as the list of parameters having moderate cardinality those parameters included in the clusters assigned to the top half of the clusters (Operation 360). Parameters included in the clusters assigned to the lower half are removed from consideration for purposes of selecting a feature set. In the example, parameter resource manager cpu allocation and above in the ranked list in FIG. 4 would be included as parameters having moderate cardinality, and parameter session max openjiles and below would no longer be considered for inclusion in the feature set.

6. Selecting a Feature Set of Parameters

Figure 5:
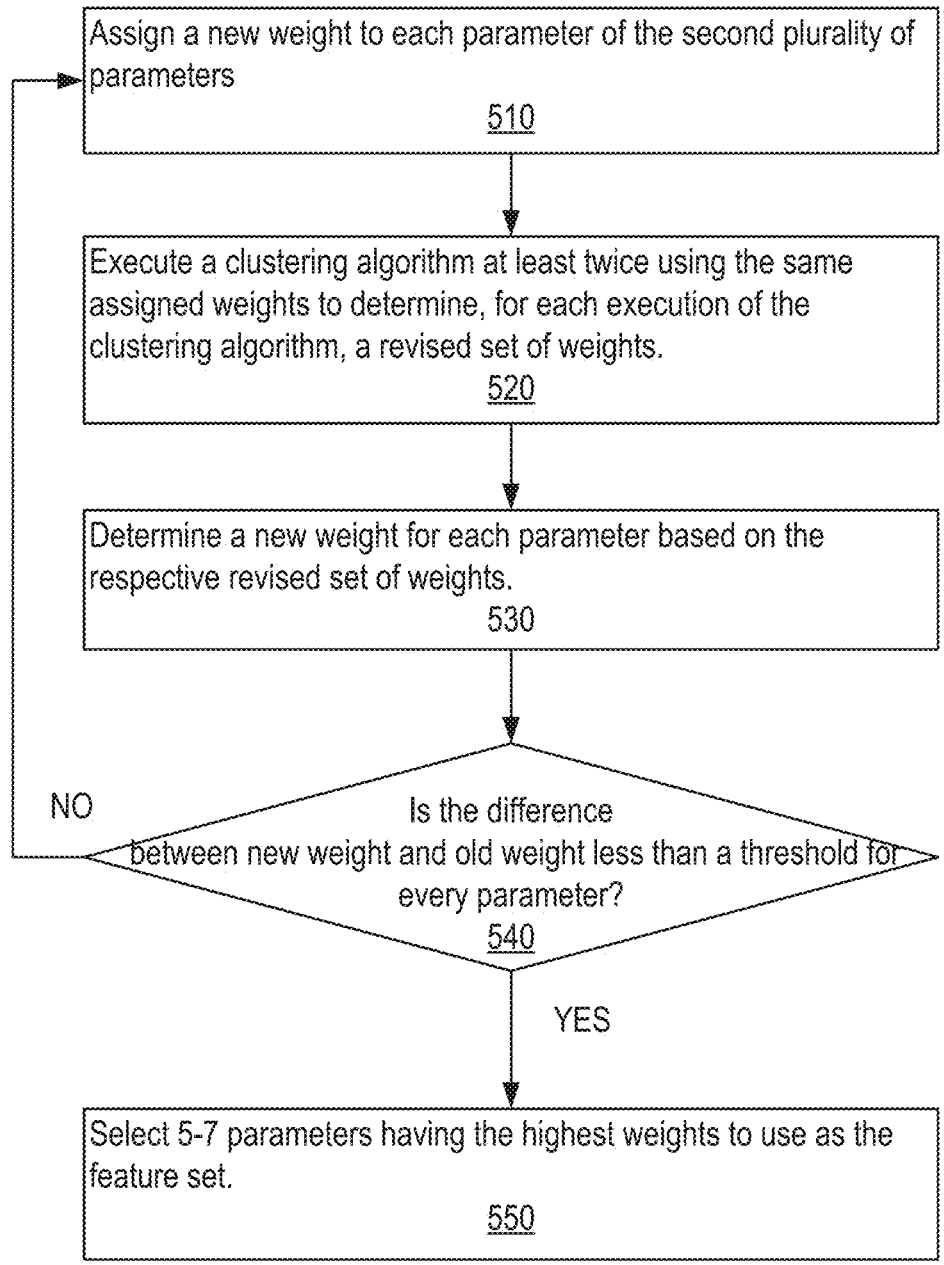
FIG. 5 is a flow diagram that illustrates at a high level assigning weights to parameters and selecting a feature set of parameters based on the weights, in accordance with one or more embodiments.

FIG. 5 is a flow diagram that illustrates at a high level assigning weights to parameters and selecting a feature set of parameters based on the weights, and describes Operation 240 in more detail, in accordance with one or more embodiments. Only the parameters in the list of parameters having moderate cardinality are considered in this process of selecting a feature set.

The feature set selector 130 assigns an initial weight to each parameter under consideration for inclusion in the feature set (Operation 510). In an embodiment, the initial weights for the parameters may all be identical. For example, each parameter may initially be assigned a weight of the inverse of the number of parameters (i.e., 1/(number of parameters). In another embodiment, initial weights may be manually configured. For example, parameters that an administrator expects to be more important based on intuition or experience may be assigned a higher weight. Alternatively, the weights may be randomly assigned.

The feature set selector 130 executes a clustering algorithm and determines a new weight for each parameter (Operation 520). Because the cluster algorithm includes some randomization, different runs of the algorithm may produce different outputs (i.e. weights for each parameters). For this reason, the feature set selector 130 (hereinafter "selector 130") runs the clustering algorithm multiple times, producing a plurality of weights for each parameter.

Next, the selector 130 assigns a new weight to each parameter by aggregating the multiple weights for the parameter produced by the different runs of the algorithm (Operation 530). Any type of aggregation may be used. As an example, the set of weights for each parameter may be averaged, and the average weight determined to be the new weight.

Selector 130 then compares the new weight for each parameter to the parameter's corresponding previous weight (Operation 540). The selector 130 compares the difference between the new weight and the old weight to a threshold to determine whether the parameter weight has converged. If there is at least one parameter whose weight has not yet converged, the process iterates starting again at Operation 510 where the new weights are assigned to the corresponding parameters and used when running the clustering algorithm in Operation 520. When convergence of weights for all parameters occurs, then selector 130 selects a small number of the parameters having the highest weights as the feature set (Operation 550). In one embodiment, a number between 5 and 7 is selected.

Figure 6:
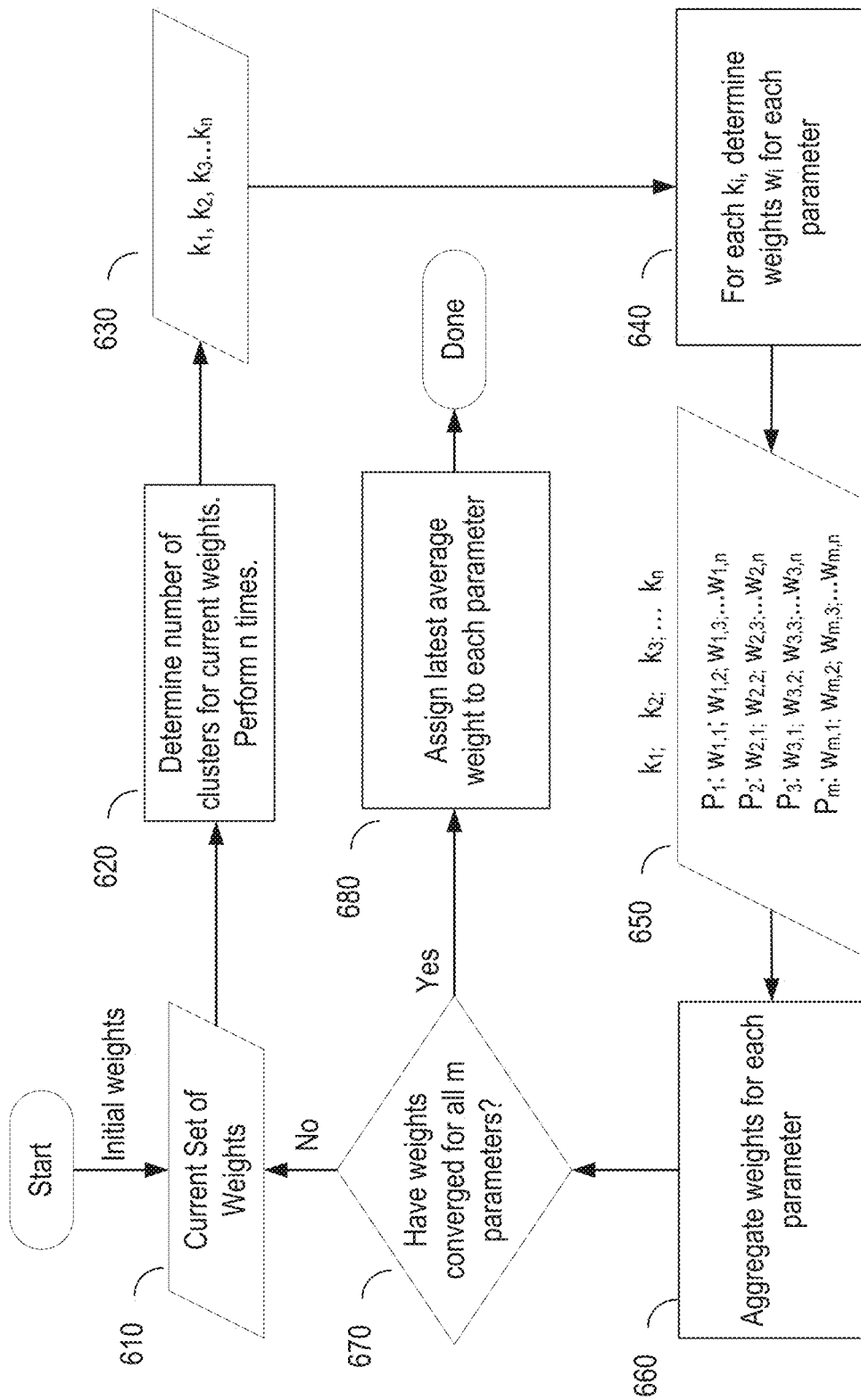
FIG. 6 is a flow diagram that illustrates assigning weights to parameters, in accordance with one or more embodiments.

FIG. 6 is a flow diagram that illustrates assigning weights to parameters, in accordance with one or more embodiments. FIG. 6 provides more detail to the process illustrated in FIG. 5. Disclosed herein is a way of combining known methods to derive an unknown method of starting with a pre-determined or random set of weights and using clustering to determine a better set of weights and iterating until the weights converges.

As explained above, at the start, an initial set of weights is determined as the current set of weights stored in datastore 610. Operation 620 determines for the set of weights an optimal number of clusters and stores the weights in datastore 610. Randomization is used in this computation, and Operation 620 executes n times producing n outputs for the optimal number of clusters. Data store 630 includes the set of n outputs from Operation 620. Each output is represented by where i is the number of the iteration that produced the output Some of the $k_i$ will be distinct and some will be the same. For example, one iteration may determine that 3 clusters are ideal, and another iteration may determine that 2 clusters are ideal. Such a process of determining an optimal number of clusters given a set of parameter weights is described in Tibshirani, Robert, Guenther Walther, & Trevor Hastie (2001), "*Estimating the number of clusters in a data set via the gap statistic*", Journal of the Royal Statistical Society B, Vol. 63, Part 2, pp. 411-423: 2001. Tibshirani proposes a "gap" method of estimating the number of clusters that is applicable to any clustering method. For example, k-means clustering may be used.

Next, Operation 640 clusters the configuration instances, for each value into $k_i$ clusters and determines a new set of parameter weights for that set of clusters. Operation 640 is executed for each of the k, outputs, creating a set of corresponding weights $w_i$ for each of m parameters, $P_j$. The parameters and their weights corresponding to each $k_i$ is shown in data store 650. That is, $w_{i,j}$ represents the weight determined for parameter j when $k_i$ clusters are formed. The clustering algorithm used by Operation 640 may be known in the art. Techniques that determine a set of weights for parameters when the number of clusters is described in Witten, Daniela M. & Robert Tibshirani (2010), "*A framework for feature selection in clustering*", Journal of the American Statistical Association, Vol. 105, No. 490, pp. 713-726: 2010. Witten describes a technique for sparse clustering. Clustering is performed based on values for a subset of features using k-means or sparse hierarchical clustering.

Operation 660 aggregates the set of weights in data store 650 for each parameter. For example, the set of weights may be averaged for each parameter. The aggregate weight for each parameter is the proposed new weight for the parameter. In Operation 670, the previous weight for each parameter j is compared to the proposed new weight parameter j to determine whether the weight for the parameter has converged by determining that the difference between the weights is less than a threshold. In an embodiment, the threshold may be manually configured. The threshold may be determined experimentally, and may be a very small number such as 1e-5. If there is a parameter for which the weights have not converged, then the values of the current set of weights stored in datastore 610 are updated with the proposed set of weights, and a new iteration of the processing is performed.

When all the parameters' weights have converged, then the processing at Operation 680 assigns the new proposed weights to the corresponding parameters. These are the weights used to rank the parameters in preparation for selecting the feature set.

FIG. 7 is a screenshot providing an example of selecting a feature set of parameters based on assigned weights, in accordance with one or more embodiments. The screenshot of FIG. 7 shows, in rank order of their weight, the parameters that have been assigned a weight by the process described above. In an embodiment, the top 5-7 ranked parameters may be selected for the feature set. However, in another embodiment, further analysis is done to determine whether there are at least a minimum number of parameters having significant impact on the output.

In a process similar to how the parameters having moderate cardinality are selected, the weighted parameters are clustered based on their assigned weights, approximately half of the clusters are selected having the highest aggregate weight among parameters assigned to the cluster. The parameters in the selected clusters are candidates for being selected in the feature set. In FIG. 7, the column labelled "High" indicates which of the parameters are candidates for the feature set due to being assigned to a cluster in the top half of clusters. In this example seven parameters are in the clusters in the top half. The "Selected" column indicates which of the candidate parameters in the High column are selected as the feature set. In this example, of the seven candidate parameters in the High column, the top five are selected as the feature set. In other embodiments a different number of parameters in the High column may be selected, for example, 6 or 7. However, when performing this analysis, only parameters in the candidate set may be chosen for the feature set. For example, if only 3 parameters are candidates, no more than 3 parameters will comprise the feature set.

7. Generating Configuration Instance Clusters

Once the feature set of parameters have been determined, graph generator 140 performs a cluster analysis based on the values of the feature set parameters. This cluster analysis produces an optimal number clusters of software resources based on the corresponding configuration instances. This analysis process may be similar to the process of determining weights for parameters.

In an embodiment, a configuration instance is represented as a vector of the feature set values (i.e. other parameter values are not used), though a person skilled in the art would understand how to perform the analysis using any representation of a configuration instance. For example, the feature vector {320, 8 GB, 97%, 30, 25} may be an instance of the feature set {CPU count, memory allocated, memory throughput, count_default_values_changed, count_undocumented_settings}. Each of the software resources are partitioned into one a plurality of clusters based on the values of the feature set parameters in their respective configuration instance. The clustering method that is used may vary from implementation to implementation. Examples may include, but are not limited to, k-mode clustering and k-means clustering, where k represents the number of clusters. In one or more embodiments, the optimal number of clusters is determined by performing the analysis for multiple values of k, where k is the total number of clusters, such as was used in the analysis for determining the parameter weights.

With k-mode clustering, for instance, the clustering process may randomly select k unique feature vectors as initial cluster centers. The clustering process may then calculate the distance between each feature vector and each feature vector randomly elected as an initial cluster center. Each feature vector is assigned to the cluster having the closest initial cluster center (that is, the smallest distance) and assign the feature vector to the cluster whose center has the shortest distance to the feature vector. A new center feature vector may then be selected for each cluster and compared with the previous center. If the new center feature vector is different from the previous center feature vector, then feature vectors assigned to the cluster may be reassigned to a different cluster. Otherwise, clustering may stop.

For example, the feature vectors may be partitioned into two clusters, three clusters, etc. up to a maximum threshold. The gap statistic may then be used to select the optimal k. According to this technique, one or more random datasets are clustered and compared to the results of clustering the actual dataset. The number of clusters k is then selected to maximize the gap statistic, which is defined as:

$$\text{Gap}_n(k) = E^*_n\{\log(W_k)\} - \log(W_k)$$

where $E^*_n$ denotes expectation under a sample size of n from the random distribution and $W_k$ is the pooled within-cluster sum of squares around the cluster mode or means.

The clustering having the optimal number of clusters is retained. For example, if the optimal value of k is three, then three clusters are retained as generated through k-mode or k-means clustering. As previously indicated, feature vectors may be assigned to clusters based on distance. The distance function that is used may vary from implementation to implementation. In one or more embodiments, a Euclidean distance is used to assign feature vectors to clusters. In some embodiments, the distance determination is weighted using the weights assigned to the feature vectors. In other cases, parameters in the feature set are not weighted when determining the distance.

In one or more embodiments, a summary is generated for each cluster. A summary may comprise information about hidden patterns or other information about the cluster that may be useful for configuration management. For example, a summary may identify the number of distinct configurations of software resources that have been assigned to the cluster, the magnitude of dispersion/differences between the clusters, and/or common configuration settings in the cluster.

FIG. 8 is a screenshot providing an example of summarizing a set of clusters, in accordance with one or more embodiments. FIG. 8 illustrates a table summarizing the clusters that were created from the example clustering analysis of the feature vectors. In the example, four clusters were created. The "Count" column indicates how many software resources were placed in the cluster, and the "Center" column indicates the range of values for the feature set found in the corresponding feature vectors. For example, cluster 2 is the largest cluster having 2466 software resources. 80% of the corresponding feature vectors had a value 200 for the db_files parameter, and 18% had a value of 1024. 87% of the 2466 feature vectors had a value of 8448 for the transactions parameter, and 6% had a value of 9960.

Each cluster may be labelled to highlight the differences. For instance, cluster 2 groups smaller deployments having fewer files, processes, sessions, and transactions than those of the other clusters. Cluster 0 groups clusters that have high values for db_files and log archive max processes.

8. Creating the Graph

Figure 9:
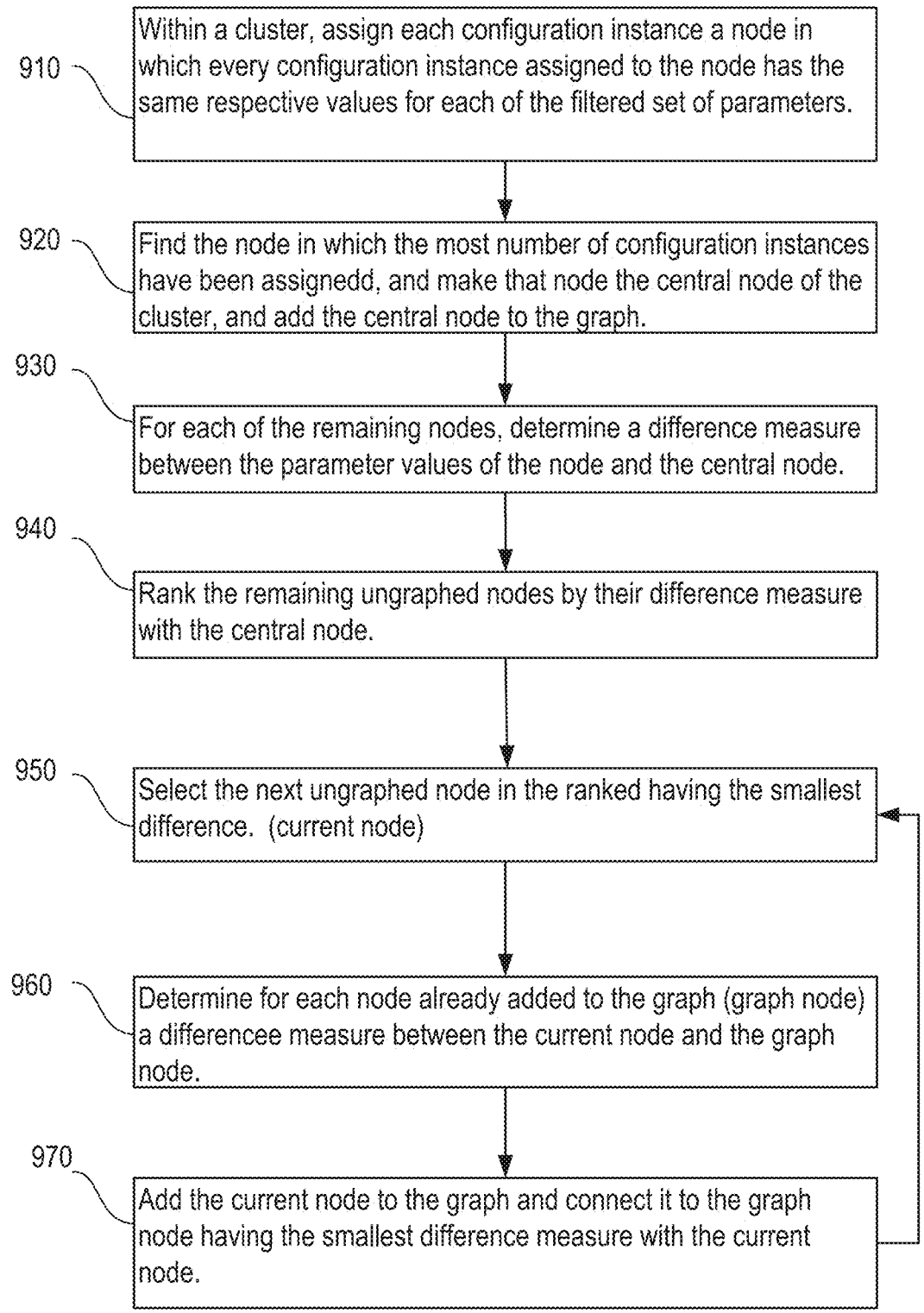
FIG. 9 is a flow diagram that illustrates creating a graph for each cluster of configuration instances, in accordance with one or more embodiments.

FIG. 9 is a flow diagram that illustrates creating a graph for each cluster of configuration instances, and describes (Operation 260) in more detail, in accordance with one or more embodiments. The clusters may be analyzed in any order. All filtered parameter values may be considered for this analysis. That is, a feature vectors representing a configuration instance comprises values for all filtered parameters, and not just for the feature set of parameters. Graph generator 140 groups together in a node (also called a state) configuration instances having identical feature vectors (Operation 910). The feature vector in common to all configuration instances assigned to a node represents the state of the node, and a different node is created for every distinct combination of filtered parameter values. Graph generator 140 identifies as the central node (also called the representative node) of the cluster the node to which the most number of configuration instances have been assigned (Operation 920). The central node is added to the graph. Next, graph generator 140 determines a measure of the difference between each remaining node and the central node (Operation 930). In an embodiment, the difference may comprise the number of parameter values in the remaining node that do not match the corresponding values in the central node. Other measures of difference may also be used.

Graph generator 140 then ranks the nodes that have not yet been added to the graph in order of their difference between the node and the central node (Operation 940). Graph generator 140 adds the not-yet-graphed nodes to the graph in rank order, adding the node with the smallest difference measure first.

Generator 140 selects the next not-yet-graphed node to process (the current node) having the least difference measure among the as-yet not-yet-graphed nodes (Operation 950). When only the central node is in the graph, the node having the smallest difference with the central node is added to the graph and connected to the central node. However, in general, generator 140 determines a difference between the current node and all other nodes already in the graph (Operation 960). The current node is added to the graph and connected to the node in the graph having the smallest difference with the current node (Operation 970). Operations 950 through 970 are repeated until there are no more not-yet-graphed nodes.

If more than one graphed node has the same smallest difference with the current node (i.e., there's a tie), a variety of tie breaking strategies may be used to determine which of the graphed nodes should be connected to the current node. In one embodiment, the current node may be connected to the node closest to the central node.

An alternative process for creating the graph comprises identifying a subset of the most populous nodes that are the nodes to which the greatest number of configuration instances have been assigned. First, the graph may be created as described above for just the subset of most populous nodes. After all of the nodes in the most populous subset are added to the graph, then the remaining not-yet-graphed nodes are added to the graph in order of their difference with the central node.

The generator 140 repeats the process for all of the other clusters. When there are no remaining clusters to summarize, then the process ends. The resulting graph is a hierarchical representation of the configuration of software resources that is computed based on the differences in configuration.

9. Interactive Interfaces for Configuration Management

In one or more embodiments, GUI 150 provides one or more interactive interfaces that are generated based on the hierarchical graph of the clusters. The interactive interfaces may allow a user to visualize, navigate, and otherwise access summary information about a cluster. Additionally or alternatively, the interactive interface may provide a user with options for performing one or more management operations based on the cluster results/summary.

Figure 10:
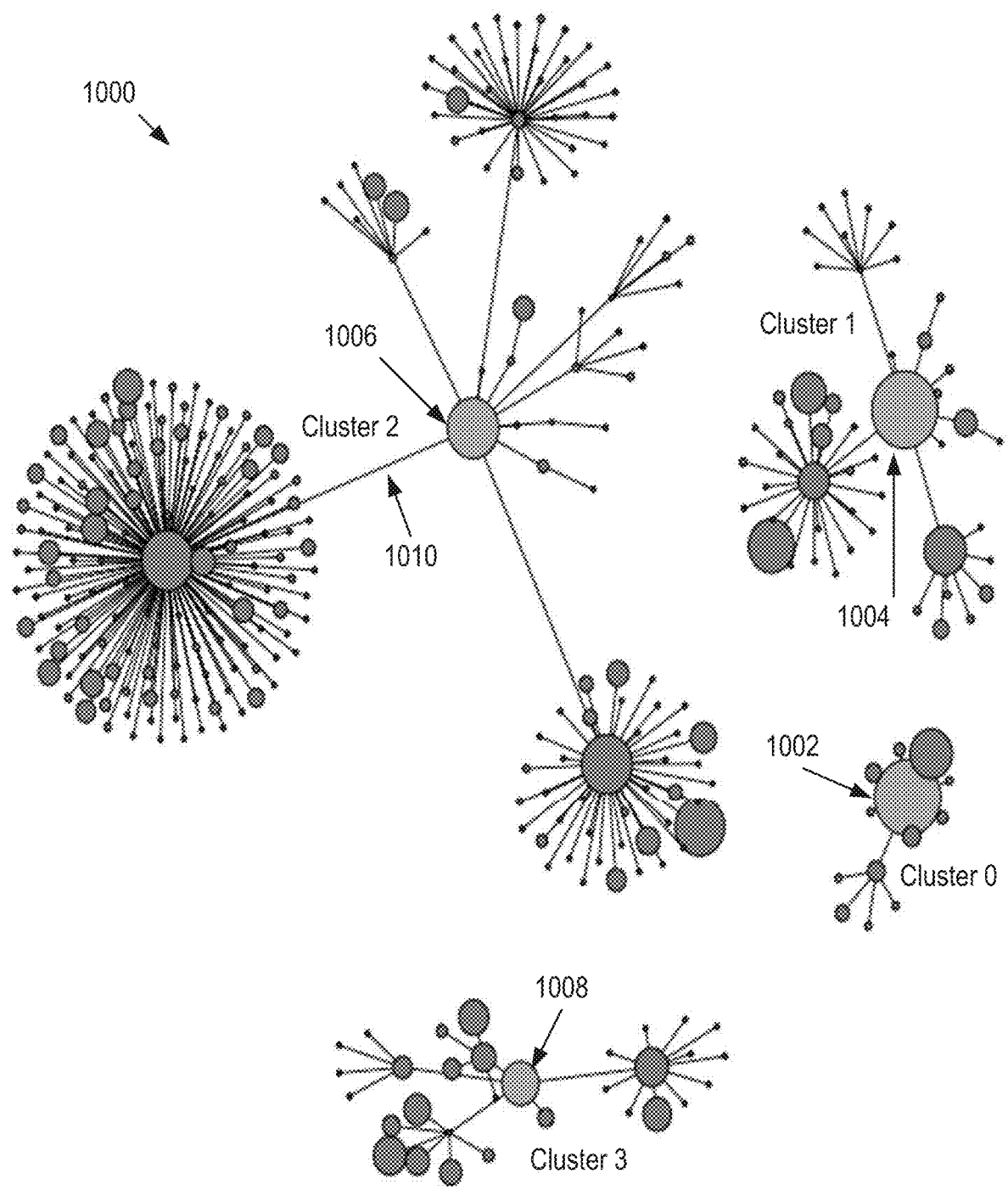
FIG. 10 illustrates an example interactive visualization of a set of clusters, in accordance with one or more embodiments.

FIG. 10 illustrates example interactive visualization 1000 of a set of clusters, in accordance with one or more embodiments. Interactive visualization 1000 displays cluster 0, cluster 1, cluster 2, and cluster 3. Each cluster includes a plurality of nodes or vertices corresponding to different instances of the clustering feature set.

Each cluster further includes a central (representative) node, corresponding to a gold image or recommended configuration for software resources assigned to the cluster. The gold image representation for clusters 0-3 are node 1002, 1004, 1006, and 1008, respectively. The representative node may be displayed in a separate color from other nodes in the cluster to facilitate identification.

In one or more embodiments, the size of a node/vertex in the graph may be proportional to the log (or some other function) of the number of software deployments having the configuration settings (and/or other values of the feature set) corresponding to the node. Nodes corresponding to a greater number of software resources may have a larger display size/area than those corresponding to fewer resources. The representative node may have the greatest display size of the nodes in the cluster.

The edge between two nodes in the graph may be selected to identify differences between different portions of a cluster. For example, selecting edge 1010 may cause a comparison between different parameter values that are different as illustrated. The edge length does not encode any aspect in the example illustrated. However, in other embodiments, the edge length may encode the difference between the vectors that represent the two nodes.

Some edges may connect different sub-clusters within a cluster. For example, edge 1010 connects the representative node 1006 with a corresponding sub-cluster. While representative node 1006 has been selected as the gold standard, the sub-cluster supports a hypothesis additional cluster. A user may sever this sub-cluster along edge 1010 to create a new cluster from the sub-set of nodes that belong to the sub-cluster. The center node for the subset of nodes may then be assigned as the representative node for the new cluster.

A user may drill-down on individual clusters and/or nodes to view more detailed information. For example, the user may select one of clusters 0-3 to view a more detailed interactive visualization for the cluster, such as given in the example below. Additionally or alternatively, a user may select individual nodes to identify which software resources are associated with a node. For example, selecting a node may cause an identifier to be displayed for each software deployment sharing the configuration corresponding to the node.

Figure 11:
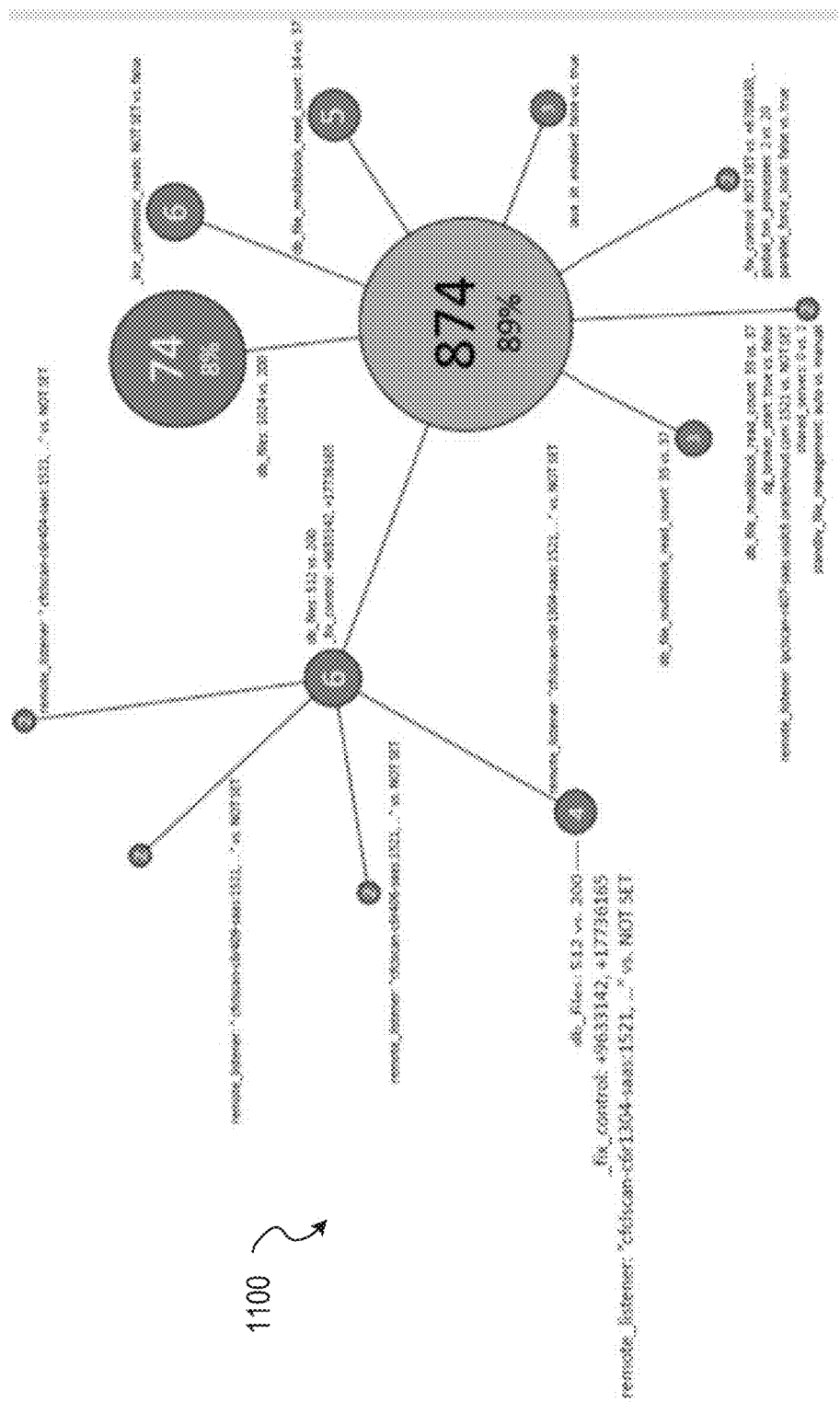
FIG. 11 illustrates an example interactive visualization for a selected cluster, in accordance with one or more embodiments.

FIG. 11 illustrates example interactive visualization 1100 for a selected cluster, in accordance with one or more embodiments. Interactive visualization 1100 displays how many configuration instances share the feature values corresponding to a node. For example, the representative node indicates that the corresponding feature values were detected in 874 software resources, comprising 89% of the software resources assigned to the cluster. The next biggest node indicates that the corresponding feature values were detected in 74 different resources comprising 8% of the software resources.

In an embodiment, analytic services 106 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

10. Management Operations

In one or more embodiments, the interactive visualizations or other interface may provide the user with an option to perform an operation based on the representative node for a cluster. Example operations may include one or more of the following:

Initializing new nodes/resources: When a new deployment of a software resource is detected, the new deployment may be assigned to a cluster based on the initial parameters. The configuration settings may then be set to match those of the representative node in the cluster.

Updating existing nodes/resources: An existing deployment/node (or group of nodes) may be updated to match the configuration settings for the representative node or any other node in the cluster. Features may be added to the software resources that were present in the representative node but initially missing from the upgraded nodes. For example, user-defined patches, scripts, or other features may be added to the upgraded node.

Drift remediation. A user may select an option to remediate drift for a given cluster or sub-cluster. The selected nodes are updated to match the configuration settings of the representative/gold node. Drift reconciliation may be applied to a single node in the cluster, to a subset of nodes, or to all the nodes in a cluster. The system may provide the user with a time estimate on the operation. Updates may be scheduled and/or staggered to mitigate downtime.

Gold image subscriptions: One or more nodes may be subscribed to the representative node. Once subscribed, the node follows changes to the representative node. Thus, an upgrade detected at the representative node may trigger upgrades to subscribed nodes/resources.

Analytic operations: An analytic operation may be run over one or more nodes in a cluster to display analytic information about the nodes. For example, aggregate performance metrics, dispersion rates, or any other data may be determined and presented to the end user.

Functional analysis: Displaying information about a small set of representative nodes may allow for a clearer understanding of the different purposes of the different clusters in the system, where a subset of information about the representative node for each cluster is displayed for the purpose of understanding these differences. For that reason, characteristics shared by all representative nodes may be excluded from the presentation, which focuses on the differences.

Troubleshooting: Fixing a problem with one node is often easier than fixing an entire cluster. If, through a visualization of the clusters and the representative nodes, a user is able to determine that a particular cluster has a problem (e.g., based on frequently occurring bug reports in the cluster, frequently occurring error logs associated with the cluster, or poor performance metrics for the cluster), optionally based on metrics displayed concurrently with the cluster that indicate the problem, then the user may attempt to troubleshoot the representative node, track configuration changes being made to the representative node, and, when the troubleshooting is complete, apply any such changes to the entire cluster.

As can be seen from the above examples, the operation's functionality may be dependent on one or more values of the feature set of the representative node or other characteristics of the representative node, either by causing display of information from the feature set on an interface, for example, in association with the representative node or the representative node's cluster, or by using such information to drive the targeted performance of a remedial operation, maintenance operation, or some other operation with respect to the representative node or the representative node's corresponding cluster. For example, any operation that requires the cluster to be treated as if the cluster were a single node (e.g., for visualization purposes, to simplify software configuration complexity, or otherwise) could take advantage of one or more values of the feature set of the representative node or any other characteristics of the representative node, even if those characteristics were not used for the purposes of generating the clusters. Characteristics of the representative node may be provided to the service executing the operation.

The interactive visualizations may support a drag-and-drop interface to perform management operations. For example, the user may drag one or more nodes to the representative node (or any other node in the cluster) to initiate one of the aforementioned management operations. Drag-and-drop may provide an intuitive interface for managing the configuration of a large number of objects. However, the management operations may be triggered via other interfaces, depending on the particular implementation.

11. Computer Networks And Cloud Networks

In one or more embodiments, a computer network provides connectivity among a set of nodes. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be a generic machine that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any arbitrary applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, a business or operation of one tenant may be separate from a business or operation of another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

12. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

13. Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

14. Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager.

In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

15. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 12:
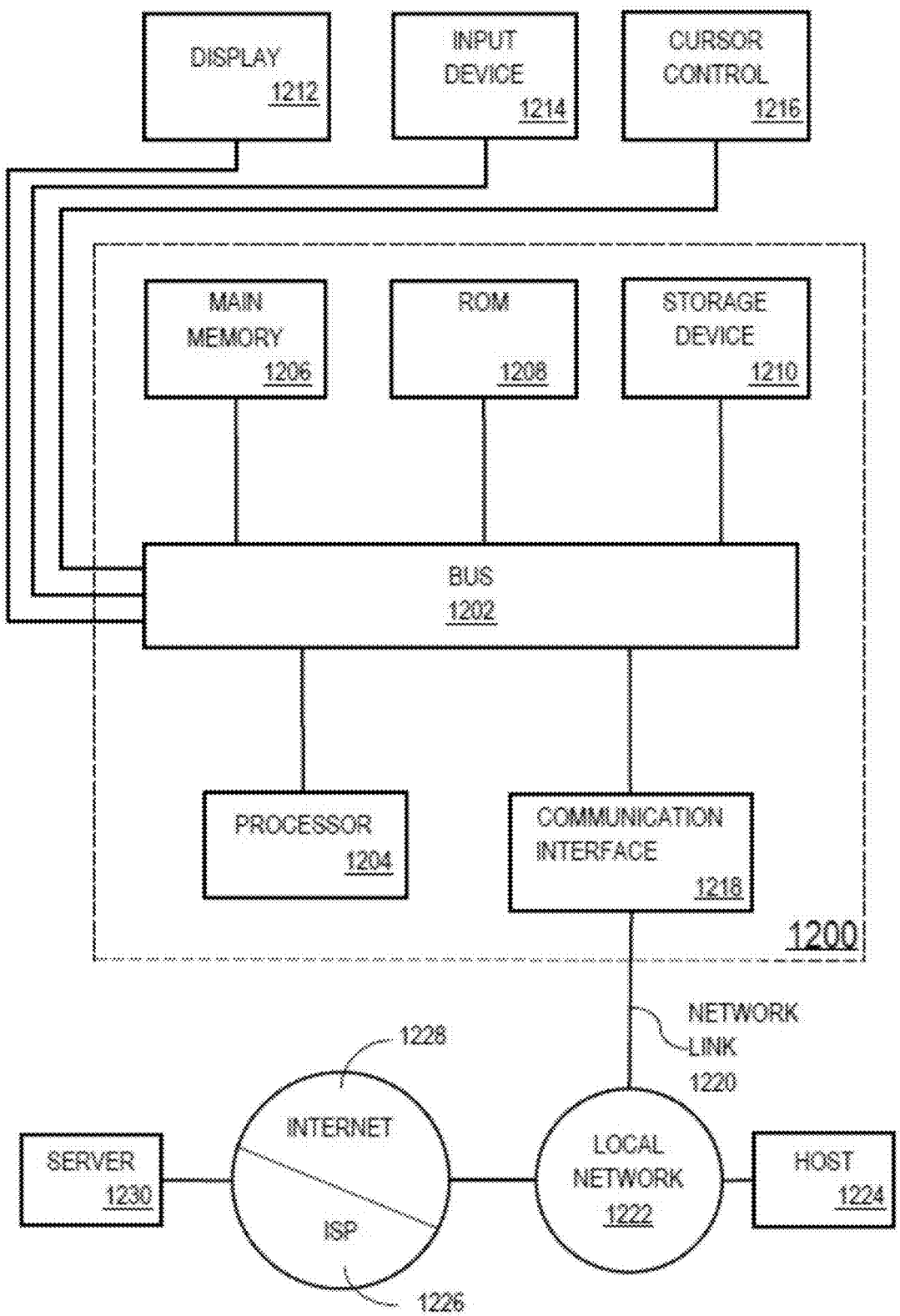
FIG. 12 shows a block diagram that illustrates a computer system in accordance with one or more embodiments.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    identifying a plurality of configuration instances, each configuration instance assigning a respective plurality of configuration values for a first plurality of parameters;
    determining a number of distinct values, for each of one or more parameters of the first plurality of parameters, across the plurality of configuration instances;
    determining a weight for each of the one or more parameters of the first plurality of parameters;
    based at least on both (a) the number of distinct values for each of the one or more parameters of the first plurality of parameters and (b) the weight for each of the one or more parameters of the first plurality of parameters:
    selecting a subset of the first plurality of parameters as a second plurality of parameters for clustering each of the plurality of configuration instances into one of a plurality of configuration instance clusters,
    wherein the second plurality of parameters includes fewer parameters than the first plurality of parameters;
    grouping each particular configuration instance, of the plurality of configuration instances, into one of the plurality of configuration instance clusters based at least on the configuration value for each of the second plurality of parameters for the particular configuration instance;
    generating and storing, in at least one data object, a representation of the plurality of configuration instance clusters;
    generating a graph of clusters based on the at least one data object; and
    presenting the graph of clusters.

2. The medium of claim 1, wherein selecting the subset of the first plurality of parameters as the second plurality of parameters comprises:
    selecting a subset of the plurality of configuration instance clusters; and
    selecting parameters in the subset of clusters as the second plurality of parameters.

3. The medium of claim 2, wherein selecting the subset of clusters comprises:
    computing a cluster average comprising an average number of distinct values for parameters in each cluster of the plurality of configuration instance clusters;

ranking the plurality of configuration instance clusters in order of cluster average to obtain a ranked list of clusters; and
selecting approximately half of the clusters with the highest cluster average.

4. The medium of claim 1, wherein
determining the weight for each of the one or more parameters of the first plurality of parameters at least by:
iteratively re-executing a clustering algorithm using the weights assigned to the one or more parameters of the first plurality of parameters, to iteratively revise the weights assigned to the one or more parameters of the first plurality of parameters until any change in each of the weights is below a respective threshold level of change.

5. The medium of claim 1, wherein the operations further comprise:
prior to selecting the second plurality of parameters, selecting a third plurality of parameters based on the weight associated with each parameter of the first plurality of parameters, determining the weight associated with each parameter of the first plurality of parameters at least by:
executing a clustering algorithm using an initial set of weights assigned to each of the first plurality of parameters, to obtain a first revised set of weights for the first plurality of parameters;
re-executing the clustering algorithm using the same initial set of weights, assigned to the first plurality of parameters, to obtain a second revised set of weights for the first plurality of parameters; and
determining the set of weights associated with the first plurality of parameters based at least on the first revised set of weights and the first revised set of weights.

6. The medium of claim 5, wherein determining said set of weights associated with the second plurality of parameters based at least on the first revised set of weights and the second revised set of weights comprises:
selecting a third set of weights for the second plurality of parameters based at least on the first revised set of weights and the second revised set of weights;
executing a clustering algorithm using the third set of weights to obtain a third revised set of weights for the second plurality of parameters;
re-executing the clustering algorithm using the third set of weights to obtain a fourth revised set of weights for the second plurality of parameters; and
determining the set of weights associated with the second plurality of parameters based at least on the third revised set of weights and the fourth revised set of weights.

7. The medium of claim 1, wherein generating the graph of clusters further comprises:
for each cluster of the plurality of configuration instance clusters:
associating each configuration instance in each cluster into one of a plurality of nodes, wherein configuration instances having identical values for each respective parameter of the first plurality of parameters are placed in a same node;
identifying a central node for each cluster of configuration instances, the central node for each cluster having a greatest number of configuration instances placed within, and adding the central node into the graph;
determining, for each cluster of configuration instances, a difference measure between each node other than the central node and the central node, wherein the difference measure comprises a number of parameters of the first plurality of parameters in which the respective parameter value for the configuration instances placed in each node is different from the parameter value for the configuration instanced placed in the central node;
identifying a closest node of the nodes other than the central node having a least number of parameter values different from the central node; and
adding the closest node to the graph and directly connecting the closest node to the central node.

8. The medium of claim 7, wherein the operations further comprise:
determining for a first node that has not yet been added to the graph, a difference measure between the first node and each node in the graph, wherein the difference measure between the first node and each node in the graph comprises the number of parameters of the first plurality of parameters in which the respective parameter value for the configuration instance in each node is different from the parameter value for the configuration instances placed in each node in the graph;
identifying a second node of the nodes in the graph having the least difference measure with the first node; and
adding the first node to the graph and directly connecting the first node to the second node.

9. The medium of claim 7, wherein presenting the graph of clusters comprises displaying a visual representation in a user interface, of the of nodes created for each cluster.

10. The medium of claim 9, wherein the operations further comprise:
responsive to receiving a selection of a node in the visual representation, identifying software resources that comprise the configuration instances placed into the selected node.

11. A system comprising:
at least one hardware device including a processor; and
the system configured to perform operations comprising:
identifying plurality of configuration instances, each configuration instance assigning a respective plurality of configuration values for a first plurality of parameters;
determining a number of distinct values, for each of one or more parameters of the first plurality of parameters, across the plurality of configuration instances;
determining a weight for each of the one or more parameters of the first plurality of parameters;
based at least on both (a) the number of distinct values for each of the one or more parameters of the first plurality of parameters and (b) the weight for each of the one or more parameters of the first plurality of parameters:
selecting a subset of the first plurality of parameters as a second plurality of parameters for clustering each of the plurality of configuration instances into one of a plurality of configuration instance clusters,
wherein the second plurality of parameters includes fewer parameters than the first plurality of parameters;
grouping each particular configuration instance, of the plurality of configuration instances, into one of the plurality of configuration instance clusters based at least on the configuration value for each of the second plurality of parameters for the particular configuration instance;

generating and storing, in at least one data object, a representation of the plurality of configuration instance clusters;

generating a graph of clusters based on the at least one data object; and presenting the graph of clusters.

12. The system of claim 11, wherein selecting the subset of the first plurality of parameters as the second plurality of parameters comprises:

selecting a subset of the plurality of configuration instance clusters; and selecting parameters in the subset of the plurality of configuration instance clusters as the second plurality of parameters.

13. The system of claim 12, wherein selecting the subset of the plurality of configuration instance clusters comprises:

computing a cluster average comprising an average number of distinct values for parameters in each cluster of the plurality of configuration instance clusters;

ranking the plurality of configuration instance clusters in order of cluster average to obtain a ranked list of clusters; and selecting approximately half of the clusters with the highest cluster average.

14. The system of claim 11, wherein determining the weight for each of the one or more parameters of the first plurality of parameters at least by:

iteratively re-executing a clustering algorithm using the weights assigned the one or more parameters of the first plurality of parameters, to iteratively revise the weights assigned to the one or more parameters of the first plurality of parameters until any change in each of the weights is below a respective threshold level of change.

15. The system of claim 11, wherein the operations further comprise:

prior to selecting the second plurality of parameters, selecting a third plurality of parameters based on the weight associated with each parameter of the first plurality of parameters, determining the weight associated with each parameter of the first plurality of parameters at least by:

executing a clustering algorithm using an initial set of weights assigned to each of the first plurality of parameters, to obtain a first revised set of weights for the first plurality of parameters;

re-executing the clustering algorithm using the same initial set of weights, assigned to the first plurality of parameters, to obtain a second revised set of weights for the first plurality of parameters; and determining the set of weights associated with the first plurality of parameters based at least on the first revised set of weights and the first revised set of weights.

16. The system of claim 15, wherein determining the set of weights associated with the second plurality of parameters based at least on the first revised set of weights and the second revised set of weights comprises:

selecting a third set of weights for the second plurality of parameters based at least on the first revised set of weights and the second revised set of weights;

executing a clustering algorithm using the third set of weights to obtain a third revised set of weights for the second plurality of parameters;

re-executing the clustering algorithm using the third set of weights to obtain a fourth revised set of weights for the second plurality of parameters; and determining the set of weights associated with the second plurality of parameters based at least on the third revised set of weights and the fourth revised set of weights.

17. The system of claim 11, wherein generating the graph of clusters further comprises:

for each cluster of the plurality of configuration instance clusters:

associating each configuration instance in each cluster into one of a plurality of nodes, wherein configuration instances having identical values for each respective parameter of the first plurality of parameters are placed in a same node;

identifying a central node for each cluster of configuration instances, the central node for each cluster having a greatest number of configuration instances placed within, and adding the central node into the graph;

determining, for each cluster of configuration instances, a difference measure between each node other than the central node and the central node, wherein the difference measure comprises a number of parameters of the first plurality of parameters in which the respective parameter value for the configuration instances placed in each node is different from the parameter value for the configuration instanced placed in the central node;

identifying a closest node of the nodes other than the central node having a least number of parameter values different from the central node; and adding the closest node to the graph and directly connecting the closest node to the central node.

18. The system of claim 17, wherein the operations further comprise:

determining for a first node that has not yet been added to the graph, a difference measure between the first node and each node in the graph, wherein the difference measure between the first node and each node in the graph comprises the number of parameters of the first plurality of parameters in which the respective parameter value for the configuration instance in each node is different from the parameter value for the configuration instances placed in each node in the graph;

identifying a second node of the nodes in the graph having the least difference measure with the first node; and adding the first node to the graph and directly connecting the first node to the second node.

19. A method comprising:

identifying a plurality of configuration instances, each configuration instance assigning a respective plurality of configuration values for a first plurality of parameters;

determining a number of distinct values, for each of one or more parameters of the first plurality of parameters, across the plurality of configuration instances;

determining a weight for each of the one or more parameters of the first plurality of parameters;

based at least on both (a) the number of distinct values for each of the one or more parameters of the first plurality of parameters and (b) the weight for each of the one or more parameters of the first plurality of parameters:

selecting a subset of the first plurality of parameters as a second plurality of parameters for clustering each of the plurality of configuration instances into one of a plurality of configuration instance clusters,
wherein the second plurality of parameters includes fewer parameters than the first plurality of parameters;
grouping each particular configuration instance, of the plurality of configuration instances, into one of the plurality of configuration instance clusters based at least on the configuration value for each of the second plurality of parameters for the particular configuration instance;
generating and storing, in at least one data object, a representation of the plurality of configuration instance clusters;
generating a graph of clusters based on the at least one data object; and
presenting the graph of clusters.

20. The method of claim 19, wherein selecting the subset of the first plurality of parameters as the second plurality of parameters comprises:
selecting a subset of the plurality of configuration instance clusters; and
selecting parameters in the subset of the plurality of configuration instance clusters as the second plurality of parameters.

21. The method of claim 20, wherein selecting the subset of the plurality of configuration instance clusters comprises:
computing a cluster average comprising an average number of distinct values for parameters in each cluster of the plurality of configuration instance clusters;
ranking the plurality of configuration instance of clusters in order of cluster average to obtain a ranked list of clusters; and
selecting approximately half of the plurality of configuration instance clusters with the highest cluster average.

22. The method of claim 19, wherein
determining the weight for each of the one or more parameters of the first plurality of parameters at least by:
iteratively re-executing a clustering algorithm using the weights assigned to the one or more parameters of the first plurality of parameters, to iteratively revise the weights assigned to the one or more parameters of the first plurality of parameters until any change in each of the weights is below a respective threshold level of change.

23. The method of claim 19, wherein the method further comprises:
prior to selecting the second plurality of parameters, selecting a third plurality of parameters based on the weight associated with each parameter of the first plurality of parameters, determining the weight associated with each parameter of the first plurality of parameters at least by:
executing a clustering algorithm using an initial set of weights assigned to each of the first plurality of parameters, to obtain a first revised set of weights for the first plurality of parameters;
re-executing the clustering algorithm using the same initial set of weights, assigned to the first plurality of parameters, to obtain a second revised set of weights for the first plurality of parameters; and
determining the set of weights associated with the first plurality of parameters based at least on the first revised set of weights and the first revised set of weights.

24. The method of claim 23, wherein determining the set of weights associated with the second plurality of parameters based at least on the first revised set of weights and the second revised set of weights comprises:
selecting a third set of weights for the second plurality of parameters based at least on the first revised set of weights and the second revised set of weights;
executing a clustering algorithm using the third set of weights to obtain a third revised set of weights for the second plurality of parameters;
re-executing the clustering algorithm using the third set of weights to obtain a fourth revised set of weights for the second plurality of parameters; and
determining the set of weights associated with the second plurality of parameters based at least on the third revised set of weights and the fourth revised set of weights.

25. The method of claim 19, wherein the method further comprises:
generating a graph of clusters further comprises:
for each cluster of the plurality of configuration instance clusters:
for each cluster of the plurality of configuration instance clusters:
associating each configuration instance in each cluster into one of a plurality of nodes, wherein configuration instances having identical values for each respective parameter of the first plurality of parameters are placed in a same node;
identifying a central node for each cluster of configuration instances, the central node for each cluster having a greatest number of configuration instances placed within, and adding the central node into the graph;
determining, for each cluster of configuration instances, a difference measure between each node other than the central node and the central node, wherein the difference measure comprises a number of parameters of the first plurality of parameters in which the respective parameter value for the configuration instances placed in each node is different from the parameter value for the configuration instanced placed in the central node;
identifying a closest node of the nodes other than the central node having a least number of parameter values different from the central node; and
adding the closest node to the graph and directly connecting the closest node to the central node.

26. The method of claim 25, wherein the method further comprises:
determining for a first node that has not yet been added to the graph, a difference measure between the first node and each node in the graph, wherein the difference measure between the first node and each node in the graph comprises the number of parameters of the first plurality of parameters in which the respective parameter value for the configuration instance in each node is different from the parameter value for the configuration instances placed in each node in the graph;
identifying a second node of the nodes in the graph having the least difference measure with the first node; and
adding the first node to the graph and directly connecting the first node to the second node.

27. The method of claim 25, wherein presenting the graph of clusters comprises displaying a visual representation in a user interface of nodes created for each cluster.

28. The method of claim 27, wherein the method further comprises:

responsive to receiving a selection of a node in the visual representation, identifying the software resources that comprise the configuration instances placed into the selected node.

29. The medium of claim 1, wherein:
the at least one data object further includes a representation of a plurality of software resources, each of which is associated with a corresponding representation of the plurality of configuration instance clusters; and
the graph of clusters comprises clusters representing software resources.

30. The medium of claim 1, wherein the graph of clusters comprises clusters presenting the plurality of configuration instance clusters.

31. The medium of claim 7, further comprising:
identifying a set of nodes not yet added to the graph;
determining the difference measure between each node of the set not yet added to the graph and the central node;
ranking each of the nodes of the set not yet added to the graph in order from the least difference measure to the greatest difference measure; and
adding the nodes of the set to the graph according to the ranked order.

32. The medium of claim 1, wherein generating the graph of clusters further comprises:
associating each configuration instance in each cluster into one of a plurality of nodes, wherein configuration instances having identical values for each respective parameter of the first plurality of parameters are placed in a same node;
generating a central node for each cluster, the central node corresponding to a pre-defined recommended configuration instance; and
connecting, via an edge, the central node for each cluster with each node of the plurality of nodes in the corresponding cluster, the edge displaying, upon selection, a comparison of different parameter values between the central node and each node connected to the central node via a corresponding edge.

33. The medium of claim 1, further comprising:
prior to selecting the subset of the first plurality of parameters as the second plurality of parameters selecting a preliminary subset of the first plurality of parameters as a third plurality of parameters, the third plurality of parameters selected based on the number of distinct values for each of the one or more parameters of the first plurality of parameters; and
from the third plurality of parameters, selecting the second plurality of parameters based on the weight for each of one or more of the parameters in the third plurality of parameters.

\* \* \* \* \*

UNITED STATES PATENT AND TRADEMARK OFFICE
CERTIFICATE OF CORRECTION

PATENT NO. : 10,789,065 B2
APPLICATION NO. : 15/972650
DATED : September 29, 2020
INVENTOR(S) : Garvey et al.

It is certified that error appears in the above-identified patent and that said Letters Patent is hereby corrected as shown below:

On the Title Page

Column 1, under Assignee, Line 1, delete "lnternational" and insert -- International --, therefor.

In the Drawings

On sheet 9 of 12, in FIG. 9, under Reference Numeral 920, Line 2, delete "assignedd," and insert -- assigned, --, therefor.

On sheet 9 of 12, in FIG. 9, under Reference Numeral 960, Line 2, delete "differencee" and insert -- difference --, therefor.

In the Specification

In Column 3, Line 17, delete "<parameter, value>pairs," and insert -- <parameter, value> pairs, --, therefor.

In Column 7, Line 34, delete "{result_cache-Max_size" and insert -- {result_cache_Max_size --, therefor.

In Column 7, Lines 62-63, delete "resource manager cpu allocation" and insert -- resource_manager_cpu_allocation --, therefor.

In Column 7, Line 65, delete "session max openjiles" and insert -- session_max_open_files --, therefor.

In the Claims

In Column 24, Line 33, in Claim 9, after "the" delete "of".

Signed and Sealed this
Second Day of July, 2024

Katherine Kelly Vidal
*Director of the United States Patent and Trademark Office*

In Column 25, Line 34, in Claim 14, after "assigned" insert -- to --.

In Column 29, Line 2, in Claim 28, after "identifying" delete "the".